(12) United States Patent
Solinsky et al.

(10) Patent No.: US 7,809,171 B2
(45) Date of Patent: Oct. 5, 2010

(54) FACIAL FEATURE EVALUATION BASED ON EYE LOCATION

(75) Inventors: James C. Solinsky, Holly Springs, NC (US); Norman C. Anheier, Jr., Richland, WA (US); Douglas L. McMakin, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 1181 days.

(21) Appl. No.: 11/035,874

(22) Filed: Jan. 10, 2005

(65) Prior Publication Data

US 2010/0002912 A1    Jan. 7, 2010

(51) Int. Cl.
*G06K 9/00* (2006.01)

(52) U.S. Cl. .................. 382/117; 382/115; 382/118; 382/154

(58) Field of Classification Search .................. 382/115, 382/117, 118, 154
See application file for complete search history.

(56) References Cited

U.S. PATENT DOCUMENTS

| | | | |
|---|---|---|---|
| 4,307,939 A | 12/1981 | Berg | |
| 4,777,630 A | 10/1988 | Burns | |
| 4,975,969 A * | 12/1990 | Tal | 382/116 |
| 5,060,304 A | 10/1991 | Solinsky | |
| 5,142,400 A | 8/1992 | Solinsky | |
| 5,561,718 A | 10/1996 | Trew et al. | |
| 5,572,596 A | 11/1996 | Wildes | |
| 5,644,642 A * | 7/1997 | Kirschbaum | 382/103 |
| 5,745,437 A | 4/1998 | Wachter et al. | |
| 5,956,122 A | 9/1999 | Doster | |
| 5,991,429 A | 11/1999 | Coffin et al. | |
| 5,995,639 A | 11/1999 | Kado et al. | |
| 6,027,216 A | 2/2000 | Guyton et al. | |
| 6,053,613 A * | 4/2000 | Wei et al. | 351/205 |
| 6,064,752 A | 5/2000 | Rozmus et al. | |
| 6,069,967 A | 5/2000 | Rozmus et al. | |
| 6,128,398 A | 10/2000 | Kuperstein et al. | |
| 6,134,339 A | 10/2000 | Luo | |
| 6,137,896 A | 10/2000 | Chang et al. | |

(Continued)

OTHER PUBLICATIONS

Hitzenberger, Christoph K.. "Optical Measurement of the Axial Eye Length by Laser Doppler Interferometry." Investigative Ophtalmology & Visual Science 32-3(1991):616-624.*

(Continued)

*Primary Examiner*—Matthew C Bella
*Assistant Examiner*—Michael A Newman
(74) *Attorney, Agent, or Firm*—Klarquist Sparkman, LLP

(57) ABSTRACT

One embodiment of the present invention includes interrogating a location along a face of a person with multiple wavelengths of electromagnetic radiation. Signals are established corresponding to detection of the wavelengths reflected from the location. A determination is made as to whether a disguising material covers at least a part of the face based on a difference in range to the location indicated by these signals. Alternatively, the signals may correspond to reflections by different portions of an eye of the person and a determination is made regarding the location of one or more eyes of the person based on the signals. In one particular nonlimiting form, a multispectral, three-dimensional signature of facial features is registered to eye location that may include the iris, nose, chin, mouth, check or the like for facial recognition/identification.

28 Claims, 10 Drawing Sheets

U.S. PATENT DOCUMENTS

| | | | |
|---|---|---|---|
| 6,252,977 B1 | 6/2001 | Salganicoff et al. | |
| 6,497,483 B2 | 12/2002 | Frey et al. | |
| 6,507,309 B2 | 1/2003 | McMakin et al. | |
| 6,529,617 B1 | 3/2003 | Prokoski | |
| 6,540,392 B1 | 4/2003 | Braithwaite | |
| 6,603,491 B2 | 8/2003 | Lemelson et al. | |
| 6,665,426 B1 | 12/2003 | Kim | |
| 6,698,653 B1 | 3/2004 | Diamond et al. | |
| 6,714,665 B1 | 3/2004 | Hanna et al. | |
| 7,280,678 B2 * | 10/2007 | Haven et al. | 382/117 |
| 7,336,987 B2 * | 2/2008 | Laurence et al. | 600/474 |
| 2002/0044674 A1 * | 4/2002 | Pavlidis | 382/118 |
| 2002/0106112 A1 | 8/2002 | Chen et al. | |
| 2002/0111607 A1 | 8/2002 | Bille | |
| 2002/0114495 A1 | 8/2002 | Chen et al. | |
| 2002/0136435 A1 * | 9/2002 | Prokoski | 382/118 |
| 2002/0136448 A1 | 9/2002 | Bortolussi et al. | |
| 2003/0053663 A1 | 3/2003 | Chen et al. | |
| 2003/0161505 A1 | 8/2003 | Schrank | |
| 2003/0223037 A1 | 12/2003 | Chernyak | |
| 2003/0235335 A1 | 12/2003 | Yukhin et al. | |
| 2004/0037450 A1 * | 2/2004 | Bradski | 382/103 |
| 2004/0076313 A1 | 4/2004 | Bronstein et al. | |
| 2004/0190759 A1 * | 9/2004 | Caldwell | 382/117 |

OTHER PUBLICATIONS

Chang, Yu-Wen, and Michael Johnson. "Portable Concealed Weapon Detection Using Millimeter Wave FMCW Radar Imaging." National Institute of Justice Office of Science and Technology (2001).*

Sekine, Akihiko, Isao Minegishi, and Hiroshi Koizumi. "Axial eye-length measurement by wavelength-shift interferometry." J. Opt. Soc. Am. A 10-7(1993).*

* cited by examiner

FACIAL FEATURE EVALUATION BASED ON EYE LOCATION

BACKGROUND

The present invention relates to facial feature evaluation, and more particularly, but not exclusively is directed to multispectral facial interrogation techniques for locating the eyes and/or related facial features.

Viable facial recognition techniques continue to be of interest in many applications; including but not limited to, security screening, transaction authorization, access control, and the like. Unfortunately, many existing systems suffer from high rates of misidentification, excessive complexity, large conspicuous device size, and/or slow processing times. Accordingly, there is an ongoing demand for further contributions in this area of technology.

SUMMARY

One embodiment of the present invention is a unique facial feature recognition technique. Other embodiments include unique systems, devices, methods, and apparatus to interrogate, recognize, and/or locate facial features. Further embodiments, forms, features, advantages, aspects, and benefits of the present invention shall become apparent from the detailed description and figures provided herewith.

DETAILED DESCRIPTION

Figure 1:
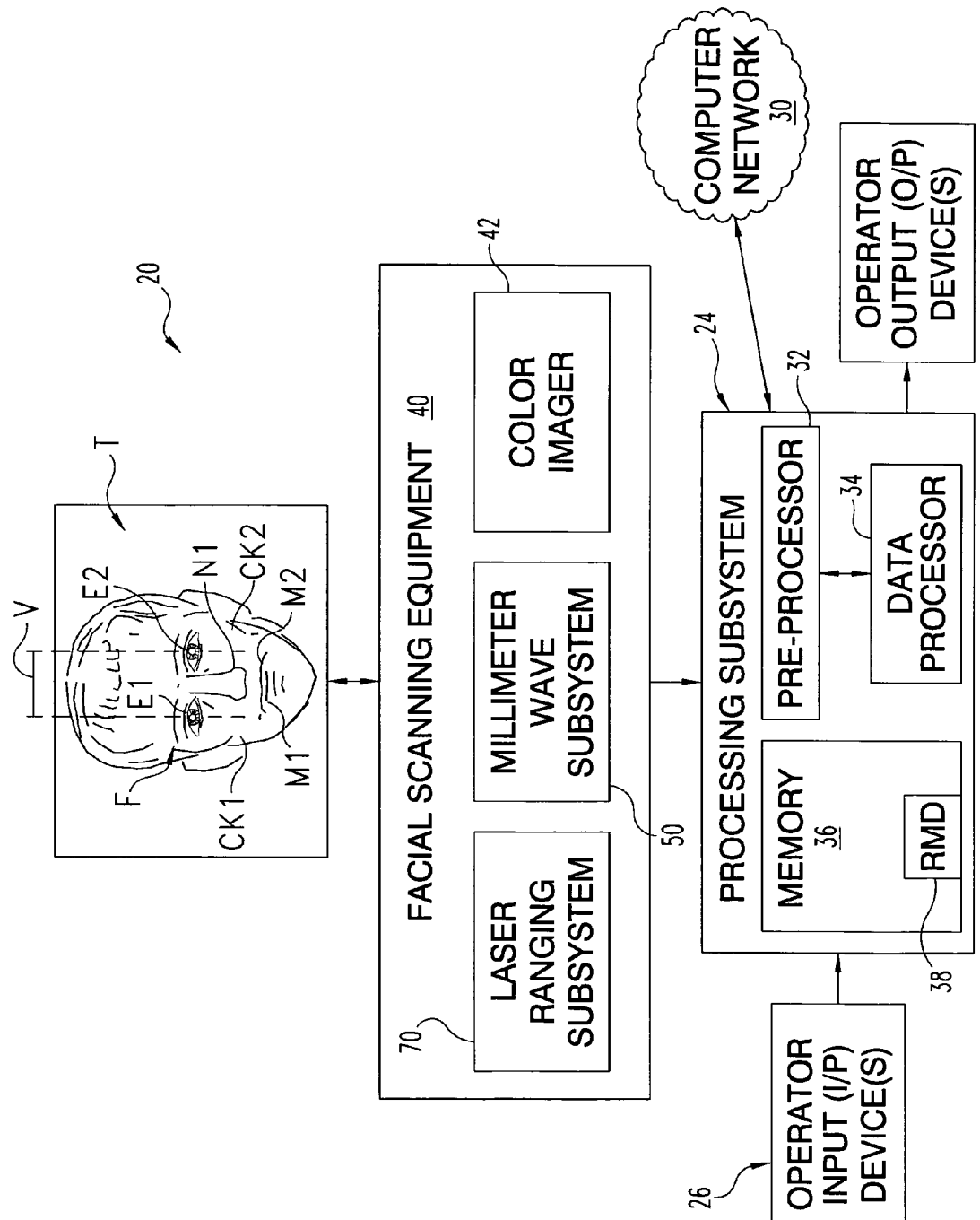
FIG. 1 is a partial, diagrammatic view of a facial evaluation system.

While the present invention may be embodied in many different forms, for the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

FIG. 1 depicts facial evaluation system 20 of one embodiment of the present invention. System 20 is configured to scan face F to evaluate selected features. In one form, this evaluation is performed for a facial recognition application. System 20 includes facial scanning equipment 40 operatively coupled to processing subsystem 24. Also coupled to processing subsystem 24 are one or more operator input (I/P) devices 26, one or more operator output (O/P) devices 28, and computer network 30. Processing subsystem 24 includes preprocessor 32 and data processor 34. Also included in processing subsystem 24 is memory 36. Memory 36 includes Removable Memory Device (RMD) 38. Facial scanning equipment 40 includes color imager 42, millimeter wave subsystem 50, and laser subsystem 70.

Operator input devices 26 can include a keyboard, mouse, or other pointing device; a voice recognition input arrangement; and/or a different arrangement as would occur to those skilled in the art. Operator output devices 28 can include a display, a printer, a speaker system, and/or a different arrangement as would occur to those skilled in the art. Computer network 30 can be provided in the form of a Local Area Network (LAN), a Municipal Area Network (MAN), and/or a Wide Area Network (WAN) of either a private type, a publicly accessible type, such as the internet; or a combination of these.

Pre-processor 32 and processor 34 can each be comprised of one or more components configured as a single unit, or as a number of separate units. When of multicomponent form, either may have one or more components remotely located relative to the others, or otherwise have its components distributed throughout system 20. Pre-processor 32 and processor 34 can each be of a general purpose integrated circuit type, a semicustom type, a fully customized type, or such different type as would occur to those skilled in the art. In one form, pre-processor 32 is based on a Field Programmable Gate Array (FPGA) that is configured with operating logic to directly process input signals from equipment 40 and provide corresponding output-signals. In one particular FPGA embodiment of pre-processor 32, the input signals are provided to the FPGA at an output frequency and the output signals are provided as multiple frames of data with an output frequency less than the input frequency. This data is typically useful to recognize scanned face F, providing a form of "signature" information specific an individual's face. By way of nonlimiting example, the ratio of input frequency to output frequency for this embodiment is about ten to one (10:1). Additionally or alternatively, processor 34 can be of general purpose type that is programmed with software instructions to process digital data received from pre-processor 32. Processor 34 can be provided with only a single Central Processing Unit (CPU); or alternatively multiple CPUs arranged to operate independent of one another, and/or in a parallel, pipelined, or different processing arrangement as would occur to one skilled in the art. One or more components of pre-processor 32 and/or processor 34 may be of an electronic variety defining digital circuitry, analog circuitry, or a combination of both. As an addition or alternative to electronic circuitry, pre-processor 32 and/or processor 34 may include one or more other types of components or control elements. Either or both of pre-processor 32 and processor 34 may be programmable, a state logic machine or other operationally dedicated hardware, or a hybrid combination thereof.

In one embodiment including electronic circuitry, processor 34 includes one or more integrated digital processing units operatively coupled to one or more solid-state memory devices defining, at least in part, memory 36. For this embodiment, memory 36 provides storage for programming instructions executable by the one or more processing units and/or can be arranged for reading/writing of data in accordance with one or more program routines.

It should be appreciated that pre-processor 32 and processor 34 each operate in accordance with logic arranged to perform various routines, operations, conditionals, and the like—including those described in connection hereinafter. This operating logic can be in the form of software programming instructions, firmware, a programmable gate, array, application specific circuitry, and/or other hard-wired logic/circuitry, just to name a few examples. Furthermore, such logic can be in the form of one or more signals carried with/encoded on memory 36, or more specifically RMD 38 of memory 36, and/or one or more parts of computer network 30. In one example, logic signals to perform one or more operations (such as programming) are transmitted to/from pre-processor 32 and/or processor 34 via network 30. Alternatively or additionally, programming can be transported or disseminated through RMD 38 or one or more other portable storage devices.

Memory 36 may include one or more types of solid-state semiconductor electronic devices and additionally or alternatively may include a magnetic or optical memory variety. For example, memory 36 may include solid-state electronic Random Access Memory (RAM), Sequentially Accessible Memory (SAM), Programmable Read Only Memory (PROM), Electrically Programmable Read Only Memory (EPROM), Electrically Erasable Programmable Read Only Memory (EEPROM), or flash memory; an optical disk memory (such as a CD or DVD); a magnetically encoded hard disk, floppy disk, tape, or cartridge media; or a combination of any of these types. Further, memory 36 may be volatile, nonvolatile, or a hybrid combination of these. RMD 38 may be of an optically encoded device (such as a disk) or magnetically encoded disk, tape, or cartridge type; a semiconductor-based card or "stick"; and/or such different form of portable/removable memory as would occur to those skilled in the art.

Besides the depicted devices, processing subsystem 24 may also include any control clocks, power supplies, interfaces, signal conditioners, filters, limiters, Analog-to-Digital Converters (ADCs), Digital-to-Analog Converters (DACs), wireless communication ports/interfaces, wire, fiber, or cable-connected communication ports/interfaces, or other types of circuits, devices, operators, elements, or components as would occur to those skilled in the art to implement the present invention.

Figure 2:
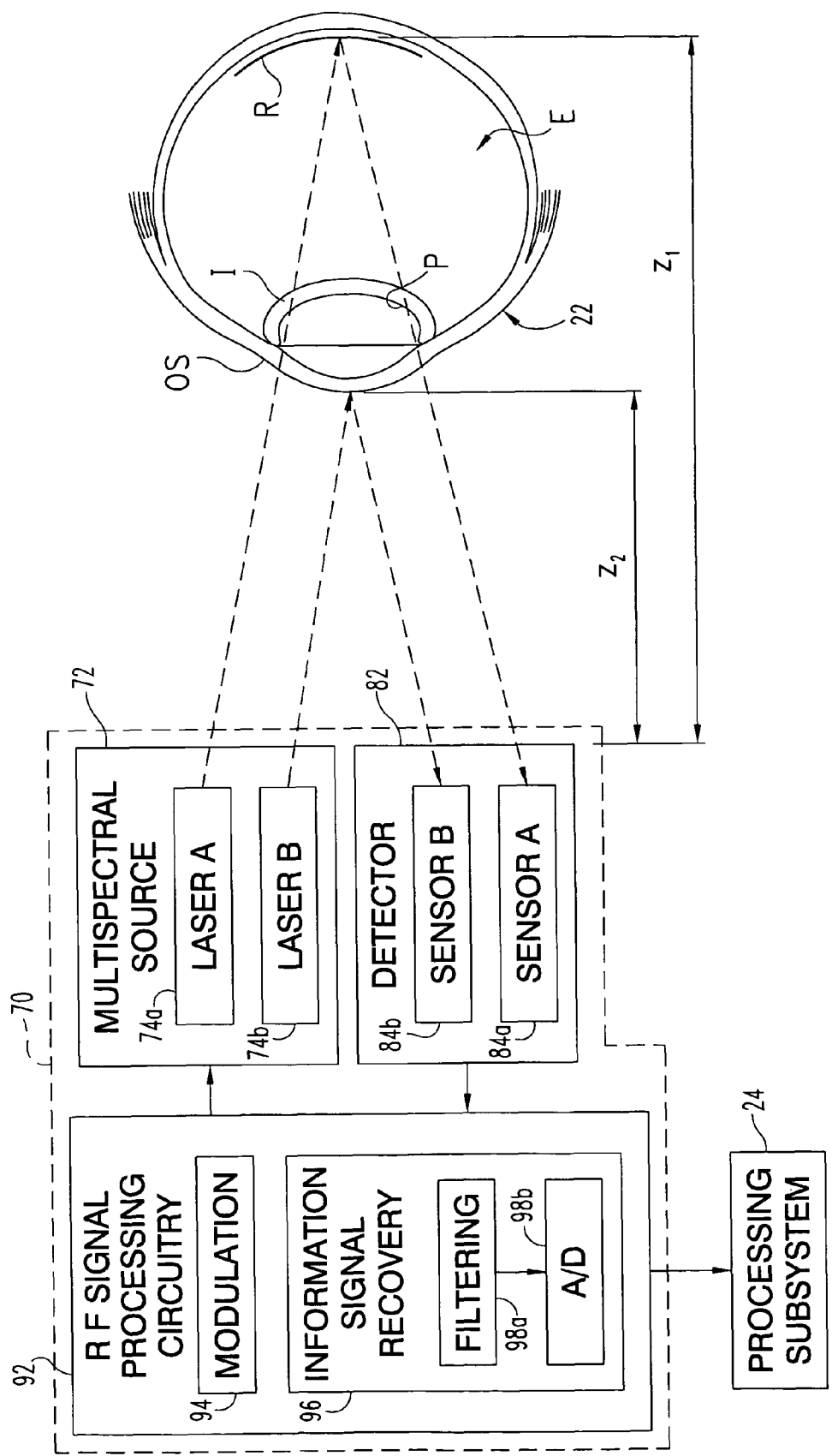
FIG. 2 is a diagrammatic view of a laser subsystem of the system of FIG. 1.

Referring to FIG. 2, further details are depicted regarding one embodiment of laser subsystem 70. Laser subsystem 70 includes multispectral source 72, detector 82, and Radio Frequency (RF) signal processing circuitry 92. Source 72 includes lasers 74a and 74b (alternatively designated laser A and laser B). Detector 82 includes sensors 84a and 84b (alternatively designated sensor A and sensor B). RF signal processing circuitry 92 is operatively coupled to source 72. Circuitry 92 controls certain operations of source 72 by providing corresponding control signals. Detector 82 is also operatively coupled to RF signal processing circuitry 92. Detector 82 provides corresponding sensor signals to circuitry 92 for processing in relation to the control signals sent to source 72. For example, circuitry 92 includes modulation circuitry 94 to provide modulating signals to source 72. Circuitry 92 also includes RF signal information recovery circuitry 96. Circuitry 96 processes signals received from detector 82 to recover interrogation information and put it in a form more suitable for subsequent processing by subsystem 24. Circuitry 96 includes filter circuitry 98a to reduce or remove one or more undesired frequencies/harmonics, and Analog-to-Digital (A/D) Converter (ADC) 98b to convert recovered interrogation information to a digital format. Corresponding digital output signals are provided from ADC 98b to processing subsystem 24. It should be appreciated that in other embodiments subsystem 24 can alternatively or additionally be configured to include at least some of circuitry 92, such as filter circuitry 98a, ADC 98b, and the like.

Figure 3:
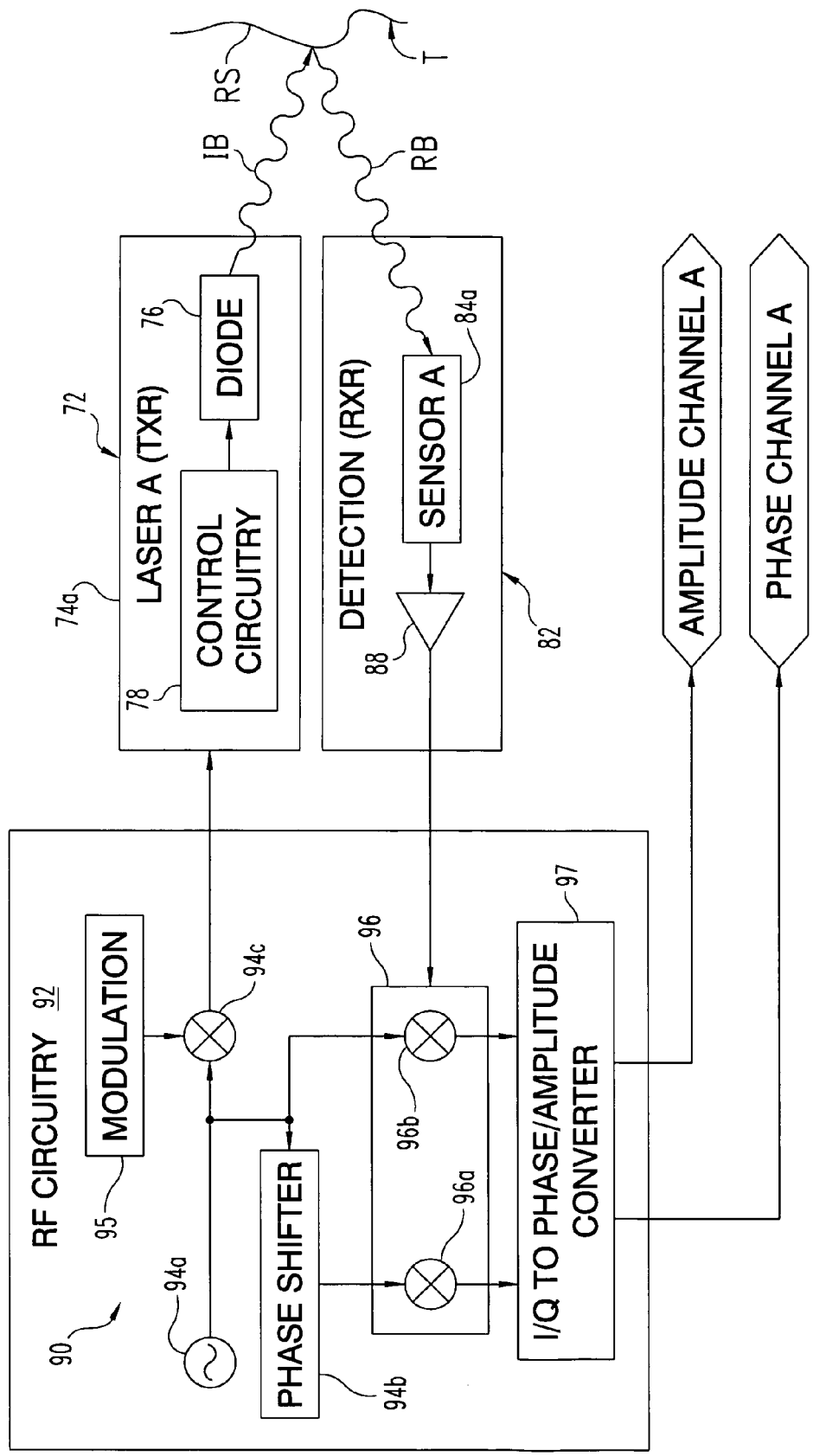
FIG. 3 is a diagrammatic view of one form of laser arrangement that may be included in the subsystem of FIG. 2.

FIG. 3 illustrates further details of one form of subsystem 70. In FIG. 3, only laser 74a of source 72, sensor 84a of detector 88, and channel subcircuitry 90 of circuitry 92 are illustrated to preserve clarity—it being understood that laser 74b and sensor 84b are configured in a like manner, with corresponding subcircuitry belonging to circuitry 92 (not shown). Laser 74a includes laser diode 76 connected to control circuitry 78. Sensor 84a is connected to amplifier 88, which in one form could be utilized to dynamically adjust amplification in an Automatic Gain Control (AGC) arrangement. Also shown in FIG. 3, RF processing circuitry 92 further includes oscillator 94a and modulation source 95 that are combined with mixer 94c. Mixer 94c provides a sinusoidal modulation signal to control circuitry 78 of laser 74a. Phase shifter 94b, which is also included in subcircuitry 90, provides a 90 degree phase-shifted form of the signal from oscillator 94a. Oscillator 94a, phase shifter 94b, mixer 94c, and source 95 are collectively included in modulation circuitry 94 of FIG. 2, but are not shown specifically therein to preserve clarity.

Channel subcircuitry 90 also includes frequency mixer 96, which is part of RF signal information recovery circuitry 94. Circuitry 96 includes mixers 96a and 96b to output corresponding in-phase (I) and quadrature (Q) signals of a standard type. Also included in circuitry 94 is converter 97. Converter 97 converts I and Q inputs from mixer circuitry 96 to provide corresponding amplitude and gain outputs. This amplitude and gain information is provided as "channel A" corresponding to laser 74a and sensor 84a. The amplitude and phase signals of channel A are filtered by circuitry 98a, converted to a digital form by A/D converter 98b, and provided to processing subsystem 24, as shown in FIG. 2. It should be understood that circuitry 92 includes circuitry like subcircuitry 90 to interface with laser 74b and sensor 84b, and provide corresponding "Channel B" amplitude and phase outputs.

In one form, circuitry 78 of laser A and B includes a laser current driver and a bias-T for inserting Amplitude Modulation (AM). Also included are standard collimation optics, connectors, and the like. For this form, detector 82 includes collection optics, a high-speed photodetector form of sensor A and B, a pre-amplifier, an automatic gain correction (AGC) amplifier, and frequency mixers 96a and 96b in the form of an integrated RF circuit component provided by ANALOG DEVICES as model number AD8302. Pre-processor 32 provides range image data by processing both the intensity and phase shift of the reflected beam (with respect to the transmitted beams of different wavelengths). The quadrature phase channel B provides a signal that can be used to accommodate target T positioning at the $2\pi$ radians range ambiguity interval. Naturally, in other embodiments, different circuitry/components can additionally or alternatively be utilized. A more detailed description of subsystem 70 and corresponding signal information processing follows.

Referring generally to FIGS. 2 and 3, subsystem 70 determines range to target T (such as an individual) in accordance with an observed phase change of modulated electromagnetic radiation of a given wavelength (or wavelength range) that is observed by comparing a modulated incident beam IB emanating from source 72 to the beam reflected by target T in response (as sensed with detector 82). This reflected beam is symbolically designated by the reference label RB and the reflecting surface is symbolically designated by the reference label RS.

The phase comparison laser measurement technique of subsystem 70 utilizes amplitude modulated (AM) continuous wave (CW) laser diode transmitters (lasers 74a & 74b). In this AM/CW laser scheme, the laser beam amplitude is modulated between zero and a maximum intensity at a specific frequency provided by oscillator 94a. Both intensity and phase shifting of the reflected beam RB (with respect to the incident beam IB from source 72) are simultaneously detected with detector 82. Comparing the transmitted and received signal phase provides a high resolution target range measurement. The resolution D of this measurement is determined by the phase angle between the transmitted modulated waveform (IB) and the received modulated waveform (RB). The relationship between phase angle $\Delta\phi_r$ (radians), time delay $t_r$, speed of light c, and modulation frequency $f_o$, is given by the following equations (1) and (2):

$$t_r = \Delta\phi_r / 2\pi f_o \quad (1)$$

$$D = ct_r/2 = c\Delta\phi_r / 4\pi f_o \quad (2)$$

Selecting a desired distance resolution of 2.0 mm and a phase resolution of $\Delta\phi_r = 5°$, the desired AM modulation frequency is given by rearranging equation (2) to the equation (3) form that follows:

$$f_o = c\Delta\phi_r / 4\pi D \quad (3)$$

Based on equation (3), the corresponding working frequency becomes approximately $f_o = 1.0$ GHz. This modulation rate sets an ambiguity interval of the phase-loaded measurement that results for phase turns of 360° or more ($2\pi$ radians). The total range corresponding to a complete phase turn (0-360°) at this frequency is 0.300 m ($D_{range} = c/(2 f_o)$). This ambiguity interval provides sufficient depth to fully image face F at target T (see FIG. 1). To address applications where such ambiguity cannot otherwise be accommodated, the AM/CW transmitter is switched to a Time-Of-Flight (TOF) measurement to measure the absolute distance to target T. This TOF information can be used to scale the laser range data, and any resulting images, to other detected/sensed information to be described hereinafter.

Stated differently, the phase-based measurement provides a degree of "fine" resolution, while the TOF measurement provides a degree of "coarse" resolution. This coarse TOF measurement effectively delimits the range that is refined with the phase-based measurement. In one particular form, TOF measurement can be made with a burst of coherent encoded energy from the laser as described in U.S. Pat. No. 5,745,437; however, in other embodiments different approaches for the "coarse" measurement can be alternatively or additionally used. It has been found that for certain applications the phase-based comparison approach provides acceptable performance in terms of cost and complexity for ranges of 30 meters or less—particularly in the area of facial recognition as will be further explained hereinafter. Naturally, in other embodiments different techniques may be alternatively or additionally employed, such as Time-Of-Flight (TOF), triangulation, and/or interferometry, to name a few.

To evaluate various facial features, determining eye location is often of interest. Facial scanning equipment 40 is arranged to locate one or more eyes based on the wavelength-selective retroreflection of light from the retina R of the human eye. Called "cat's eye" reflection, this phenomenon produces the red-eye effect sometimes seen in photographs. Accordingly, eye E is alternatively designated retroreflector 22. By selecting different wavelengths for laser A and laser B, different ranges for retina R and a part of the eye closer to source 72 (such as the outer surface OS of eyeball E in FIG. 2) can be observed. A corresponding range difference relatively unique to eye E for the selected wavelengths can be used to determine where an eyeball is located relative to a timed scan of a typical human face. FIG. 2 further illustrates the approach, symbolically showing that the wavelength-selective light from laser 74a is reflected by retina R of eyeball E, while wavelength-selective light from laser 74b is reflected by outer surface OS of eyeball E. Sensor 84a is arranged to selectively detect the laser 74a wavelength reflected by retina R, and sensor 84b is arranged to selectively detect the laser 74b wavelength reflected by outer surface OS. Pupil P and Iris I of eyeball E are also illustrated is FIG. 2 for reference. It should be appreciated that the radiation from laser 74a passes through pupil P as it is transmitted to and returned from retina R.

For this approach, laser wavelength selection bears on the contrast between retina R and outer surface OS reflection desired for eye detection. In one embodiment, 0.9 and 1.55-micron laser wavelengths are utilized for lasers 74a and 74b, respectively. Transmission from the retina R is approximately 87% at 0.9 microns and 0% at 1.55 microns. The reflectivity of the eyeball outer surface OS is about 2% at 1.55 microns. Assuming all the light is returned to detector 82, the amplitude ratio is about 0.87/0.02=43.5. Further, the reflectivity of human skin at 0.9 and 1.55 microns wavelength is in the range of 84% and 27% respectively. Assuming all the light is returned to detector 82, the amplitude ratio is 0.84/0.27=3.1. Therefore the eyeball detection contrast is enhanced by over a factor of ten using this dual wavelength approach. Further discrimination is provided as a result of the relatively longer round-trip travel of the 0.9-micron wavelength beam (IB and RB) through the interior of eyeball E. The path difference ($z_1 - z_2$) between the dual laser radar wavelengths differs by a measurable amount. A typical human eyeball E has a diameter of about 25 millimeter (mm). Accordingly, a 2 mm range resolution provides about a 25-to-1 $z_1 - z_2$ signal differentiation.

For the wavelength selections of 0.9 micron (laser 74a) and 1.55 microns (laser 74b) it should be appreciated that the two corresponding laser beams are invisible to humans. Consequently, utilization of these wavelengths is more covert than visible light. Furthermore, it has been found that these wavelengths transmit through optical glass and optical plastic at a relatively high level (about 90% and 85% respectively), which are materials commonly used to make lenses of eyeglasses. Nonetheless, in alternative embodiments, one or more of these wavelengths may be different as would occur to those skilled in the art.

More specifically describing information recovery with circuitry 92, evaluation of the amplitude and phase shift of the received sinusoidal signal, represented as "S" with respect to the AM modulation sinusoidal signal, represented as "R," provides the target range information, as expressed in the following equations (4) and (5):

$$R = A_R \sin(\omega t + \phi_R) \quad (4)$$

$$S = A_S \sin(\omega t + \phi IB_S) \quad (5)$$

$A_S$ will have a constant amplitude and $A_R$ and $\phi_R$ can be evaluated using the complex form for the sinusoidal oscillation, as given by equation (6) that follows:

$$e^{j\omega_1 t} = \cos(\omega_1 t) + j \sin(\omega_1 t) \quad (6)$$

by multiplying equations (4) and (5) by equation (6), and eliminating the components at frequency ω+ω₁, the quadrature down conversion of signals R and S is obtained at a frequency $\omega_d=\omega+\omega_1$, thus obtaining equations (7) and (8) as follows:

$$S_d = -j\frac{A_S}{2}e^{j(\omega_d t + \phi_S)} \quad (7)$$

$$R_d = -j\frac{A_S}{2}e^{j(\omega_d t + \phi_R)} \quad (8)$$

By multiplying equation (7) by the complex conjugate of equation (8), equation (9) is obtained as follows:

$$Y = A_S \frac{A_R}{4} e^{j(\phi_S - \phi_R)} \quad (9)$$

Equation (9) represents a vector whose unit of measurement is proportional to $A_S$ and whose phase is equal to $\phi_S - \phi_R$.

Figure 4:
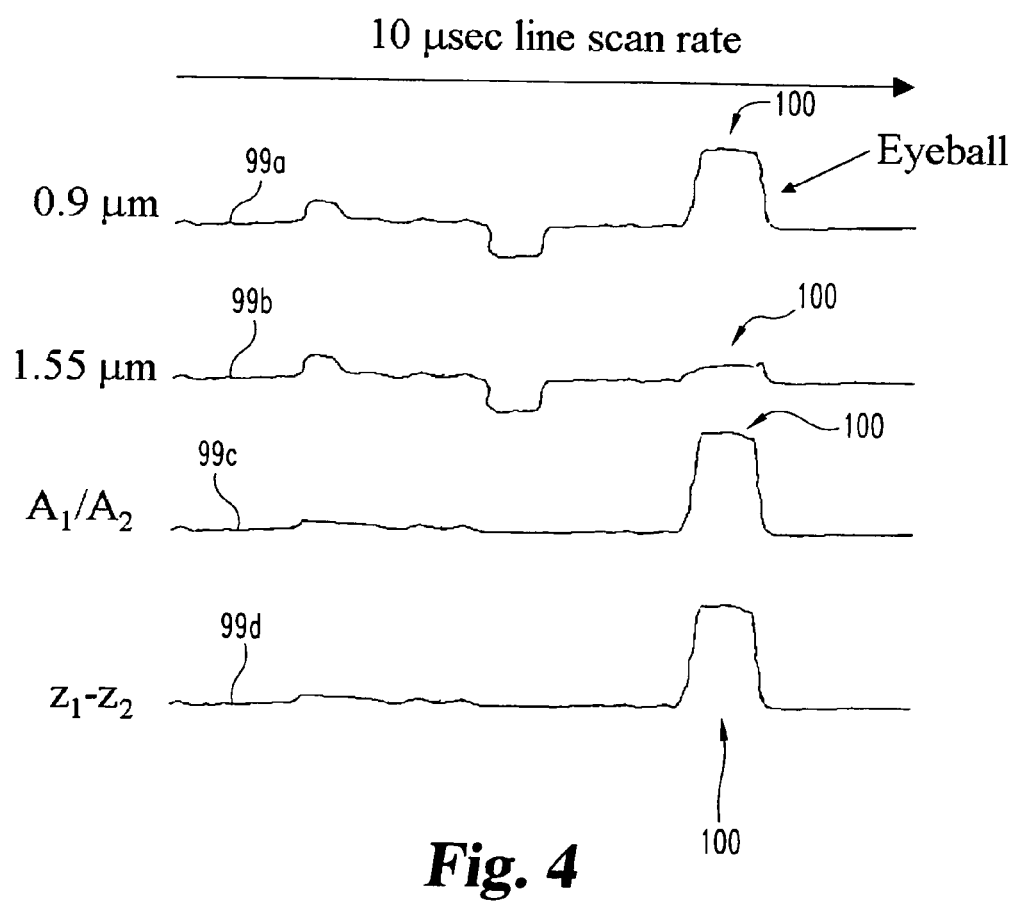
FIG. 4 is a signal diagram relating to eye location determined with the system of FIG. 1.

FIG. 4 shows a signal diagram resulting from one experimental example of the present application with an experimental equipment set-up corresponding to subsystem 70. This diagram is based on 0.9 and 1.55-micron (μm) wavelength selections for lasers 74a and 74b, respectively. In FIG. 4, line scan 99a and line scan 99b show relative detected intensity information returned at the respective 0.9 micron (μm) and 1.55 (μm) wavelengths. The ratio of intensity (magnitude) of $A_1/A_2$ is illustrated in line scan 99c, and the difference in range $z_1-z_2$ as determined by phase change is shown in line scan 99d. The position of the eye (eyeball) relative to the scan timing is also designated by reference numeral 100. As a result, not only phase difference, but also magnitude difference can be used to discriminate eye location. The location of one or more eyes relative to the other facial range information can be determined from the scan timing. Beside eye location, range information, and corresponding imagery; other facial interrogation techniques are provided by system 20.

Figure 5:
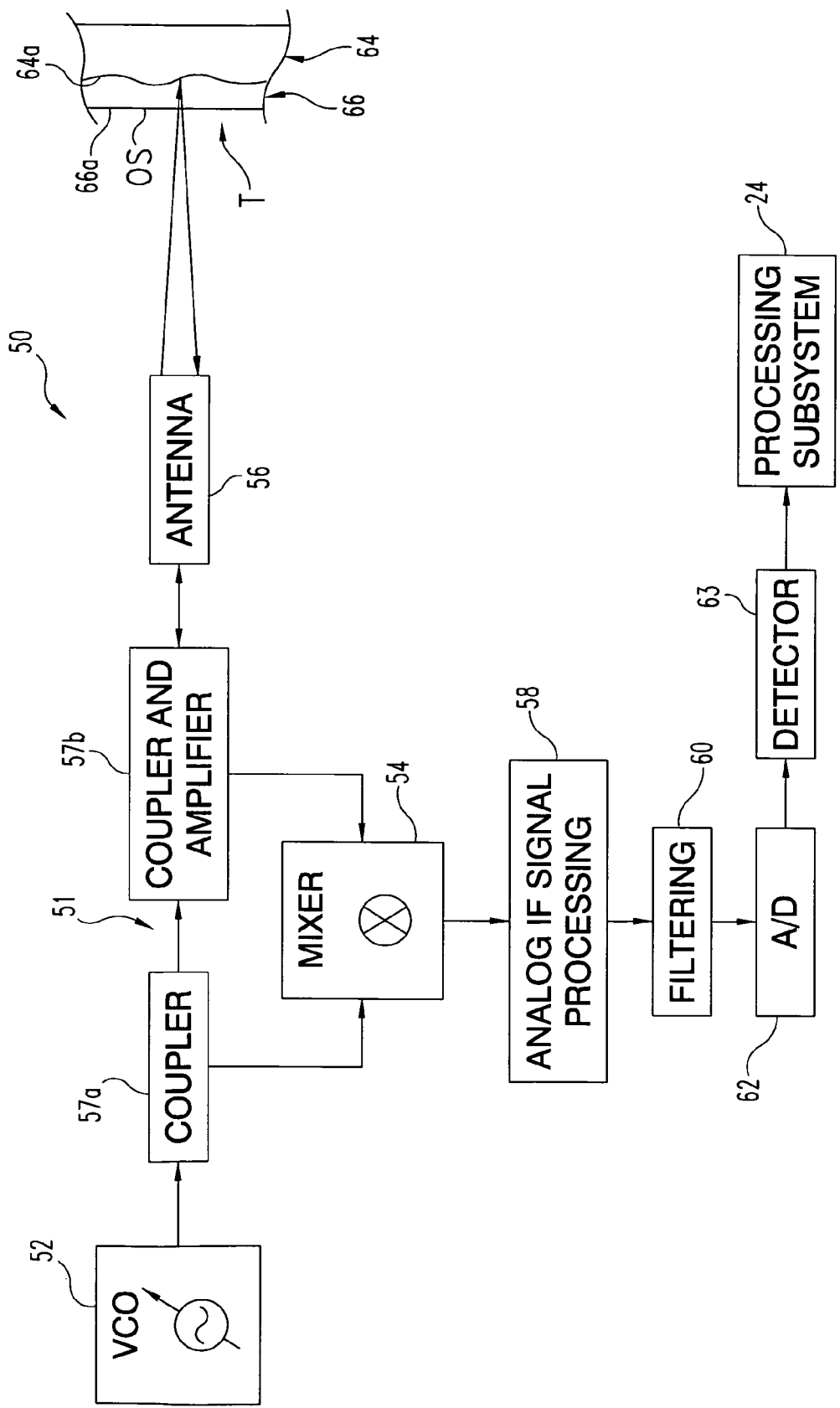
FIG. 5 is a diagrammatic view of a millimeter wave subsystem of the system of FIG. 1.

Next, referring to FIGS. 1 and 5, millimeter wave subsystem 50 is further described. Subsystem 50 is included in equipment 40 to enhance biometric information corresponding to Target T, as will be further described hereinafter. Subsystem 50 is arranged with interferometer 51 that includes Voltage Control Oscillator (VCO) 52 connected to mixer 54 and antenna 56 by couplers 57a and 57b as shown in FIG. 5. Mixer 54 is operatively connected to analog signal processing circuitry 58. Oscillator 52 outputs a signal to couplers 57a and 57b, and to mixer 54. Coupler 57b further includes an amplifier to drive antenna 56 with the oscillator output signal. It should be appreciated that in other embodiments oscillator 52 may be of a fixed frequency type rather than a VCO and/or be in the form of a different time varying source to provide a drive signal at the desired frequency.

Circuitry 58 includes components to provide an Intermediate Frequency (IF) derived from oscillator 52 and mixer 54 to provide range information relating to the distance of Target T from antenna 56 in a standard manner. Circuitry 58 provides an analog signal corresponding to this range information. Circuitry 58 is connected to filter 60 for filtering-out undesirable frequencies (i.e., harmonics) from the information signal. This filtered signal is then provided to Analog-to-Digital Converter (ADC) 62 for conversion to a digital format. In one form, the filtered signal input to ADC 62 is oversampled at four time (4×) the Nyquist criterion sampling rate to generate I and Q demodulated outputs in accordance with standard techniques. ADC 62 is coupled to detector 63 to detect the desired information. For a 4× sampling rate with ADC 62 to provide I and Q outputs, detector 63 could be defined within subsystem 24. In other arrangements, different interrogation, sampling, modulation/demodulation, or the like can be used as would occur to one skilled in the art.

In the depicted embodiment, interferometer 51 uses a monostatic antenna arrangement that transmits and receives millimeter waves. Antenna 56 is configured for a narrow beam pattern (spot size) that is mechanically scanned to measure facial dimensions. For some applications, it is preferred that high millimeter-wave frequencies (200-400 GHz) be utilized to provide a relatively small subsystem size.

Subsystem 50 utilizes low-power millimeter waves (radar signals) to illuminate the person being measured. These interrogation signals can penetrate typical clothing material, but are reflected/scattered by skin of the human body. Reflected signals are detected and processed with system 20 to capture spatial coordinate data. From this data, three-dimensional (3-D) measurement and corresponding representations (images) of human facial features can be provided to complement the three-dimensional range data gathered with subsystem 70. Furthermore, millimeter wave signals can readily penetrate optically opaque materials such as body hair, make-up, and disguises. Correspondingly, typical clothing, make-up, disguise materials, and hair are generally transparent to the millimeter wave interrogation signals.

As illustrated in FIG. 5, a schematic partial cross section of target T is shown, including a layer of skin 64 with boundary 64a, and disguise layer 66 with boundary 66a, which covers boundary 64a of skin 64. Boundary 66a is generally coextensive with outer surface OS for the FIG. 5 cross section. Subsystem 50 penetrates disguise layer 66, reflecting from skin 64 at boundary 64a. While subsystem 50 provides information representative of facial skin topology—including boundary 64a covered by disguise layer 66, 3-D data gathered with subsystem 70 typically is reflected by make-up and disguise materials, such as boundary 66a of disguise layer 66. By comparing data obtained with subsystem 50 and subsystem 70, make-up or other disguise or skin covering materials can be discovered that might otherwise go undetected.

From subsystem 50 and/or subsystem 70, 3-D facial biometrics can be comprised of dimensional information from the scanned individual's anatomy. Once an individual reaches maturity (adulthood), his or her skeletal anatomy does not normally change dramatically over time (exceptions can include accident or disease). Corresponding surface data enables calculation of critical 1D, 2D and 3D skeletal dimensions and anthropometric measurements. The length and shape of various bones can be obtained from surface evidence (e.g., joints, skin protrusions). Because the skin covering the cranium is fairly thin, volumetric measurements of the skull and critical anthropometric data (e.g., placement, shape and distance between eye sockets) can also be obtained for those applications where desired.

In FIG. 1, facial scanning equipment 40 further includes color imager 42. Color imager 42 provides imagery of target T in the standard color video Red-Green-Blue (RGB) format for processing subsystem 24. This color image data can be used to compliment data gathered with subsystems 50 and 70. For example, color images of a target T can be used to provide a visual representation of target T to an operator—with or without an indication of other information determined with subsystem 50 and/or subsystem 70.

Figure 6:
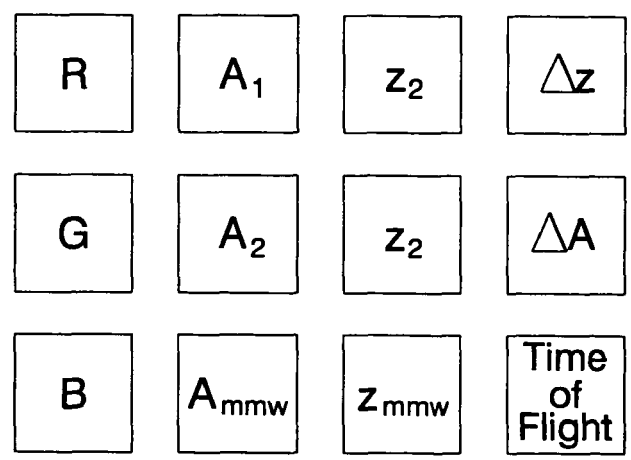
FIG. 6 illustrates a matrix of parameters that can be utilized in performing facial evaluation/recognition with the system of FIG. 1.

3-D facial scanning equipment 40 provides a rich feature vector space, where multispectral and/or multilayer 3-D range imagery are combined to provide information regarding target T. Feature vector space can be characterized with the analog video RGB channels, the signal amplitudes A, z ranges, and/or TOF measurements from subsystem 70, and millimeter wave information from subsystem 50 including path length and amplitude differences. FIG. 6 symbolically presents a matrix of parameters that can be used to provide unique biometric characterizations of face F of target T. In FIG. 6, color/image information from imager 42 is represented by the RGB color components (1st column). Amplitude/range for laser A and laser B are represented by $A_1/z_1$ and $A_2/z_2$, respectively. An amplitude comparison corresponding to a difference or ratio is represented by $\Delta A$ (proportional to $A_1/A_2$ and/or $A_1-A_2$) and a range comparison corresponding to a difference in ratio is represented by $\Delta Z$ (proportional to $Z_1/Z_2$ and/or $Z_1-Z_2$). Amplitude and range indicated by millimeter wave interrogation are represented by $A_{mmw}$ and $Z_{mmw}$, respectively. TOF is also represented in the matrix of FIG. 6. The feature vectors are digitized at an analog color baseband frequency. Circuitry 25 can correspondingly provide a "color video" data fusion output in a multispectral format. For this approach, the laser beams from both lasers of subsystem 70 and the millimeter waves of subsystem 50 are raster-scanned across the target T at scanning rates compatible with data fusion and analog video. In one form, some or all of the FIG. 6 parameters are generated by pre-processor 32 as a set of signals that define a facial 'signature' in multiple frames. These signature signals provide data from which scanned face F can be recognized/identified.

Figure 7:
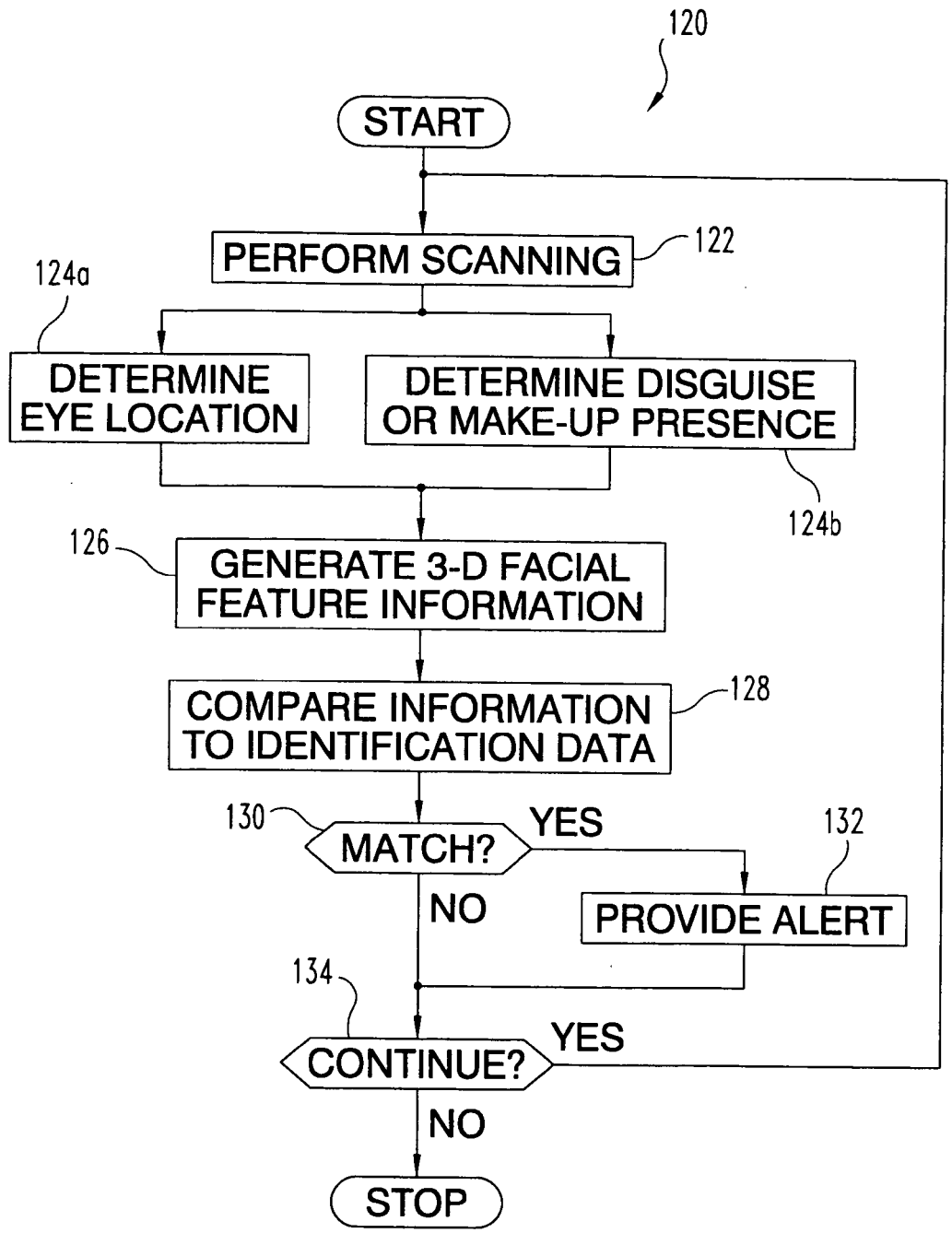
FIG. 7 is a flowchart of one mode of operating the system of FIG. 1.

Referring generally to FIGS. 1-5 and specifically to FIG. 7, procedure 120 of another embodiment of the present application is illustrated in flowchart form. Procedure 120 is implemented with system 20, and appropriately configured operating logic of subsystem 24 and equipment 40. This operating logic can be in the form of programming instructions, hardwired sequential or combinational logic, and/or adaptive or fuzzy logic, to name just a few possibilities.

Procedure 120 begins with operation 122 in which equipment 40 is utilized to scan face F of target T. Scanning of operation 122 includes generating at least two different selected wavelengths A and B of subsystem 70 to provide a topological scan of face F and locate eyes E1 and E2 thereof. Also included is a scan with subsystem 50 to penetrate disguises, make-up, hair, and the like, while being reflected by skin of target T to provide corresponding 3-D facial data. In addition, color image information is provided with subsystem 42 during operation 122. Collectively, this signature data can be provided and grouped into frames with pre-processor 32, and input to processor 34, which performs subsequent operations/conditionals.

From operation 122, procedure 120 continues with parallel operations 124a and 124b. In operation 124a, eye location is determined as described in connection with subsystem 70. In operation 124b, disguise or make-up presence is determined by comparing data obtained with subsystems 50 and 70. Notably, while operations 124a and 124b are performed in parallel, in other embodiments they can be performed in sequence in any order.

From operations 124a and 124b, procedure 120 continues with operation 126. In operation 126, desired three-dimensional facial feature information is developed to provide a basis to uniquely identify target T for facial recognition purposes or the like. Examples of the type of information that could be developed in operation 126 are characterizations of the type described in connection with FIG. 6. Alternatively or additionally, this information could be based on eye-to-eye vector distance V and various vectors determined in relation to eye location or vector V including, for example, vectors to cheeks CK1 and/or CK2, mouth-corners M1 and/or M2, nose N1, and/or chin C1, (see FIG. 1)—to name just a few possibilities.

From operation 126, operation 128 of procedure 120 is performed. In operation 128, at least a portion of the information developed in operation 126 is compared to identification data stored on a local and/or remote identification database. This database can take any of several forms. In one example, a two-dimensional image database is utilized from which 3-D constructs are created. 3-D information determined in operation 126 is then compared in operation 128. Additionally or alternatively, 3-D information obtained in operation 126 can be converted to two-dimensional data for comparison to a two-dimensional database of identification information. In one particular example, the three-dimensional data from system 20 is converted to five two-dimensional images for comparison to images in a preexisting two-dimensional image database. In still another example, a new three-dimensional database can be developed for use in the comparison of 128. In yet other examples, these approaches are combined.

Procedure 120 continues from operation 128 with conditional 130. In conditional 130, it is tested whether the comparison of 128 indicates a suitable match of target T to information present in the corresponding database. If the test of conditional 130 is true (affirmative), then procedure 120 continues with operation 132 in which an alert is provided to an operator. Such operator can be locally or remotely positioned with respect to equipment 40 and/or target T. If the test of conditional 130 is false (negative) then procedure 120 continues with conditional 134. Conditional 134 tests whether to continue scanning target T or another target. If the test of conditional 134 is true (affirmative) procedure 120 loops back, returning to operation 122 to perform the 122-128 sequence again for submission to conditional 130. This loop can be repeated as desired based on the outcome of conditional 134. If the test of conditional 134 is false (negative), then procedure 120 halts.

Procedure 120 is but one example of a mode of operating system 20. It should be appreciated that many combinations, rearrangements, deletions, and the like are contemplated in other embodiments. For example, in other embodiments one or more of subsystems 42, 50, or 70 may be absent. In still other embodiments, the selected wavelengths of electromagnetic radiation utilized for interrogation by subsystem 70 may vary as deemed appropriate. Likewise, the nature and type of interrogation performed with millimeter waves can vary with adaptations made to subsystem 50 as appropriate. Further, subsystem 42 can be altered as appropriate. In one particular example an infrared scan with corresponding color representation is provided as an addition or alternative to subsystem 42. In still other embodiments, one or more subsystems or aspects of system 20 are applied to one or more other portions of a person's body as an addition or alternative to face F. Further, system 20 or subsystems thereof may be utilized in connection with the interrogation of objects other than a person. In one particular embodiment, subsystem 70 is utilized to determine eye location for a different facial evaluation technique that may be provided with or without subsystem 50 and/or 42. Processing subsystem 24 would be adapted for any of these variations as appropriate to the particular operating goals of the alternative embodiment. In yet further embodiments, multispectral interrogation is used to detect and/or evaluate inanimate objects including one or more retroreflectors. In one particular example, retroreflectors in optical tags can be interrogated in such embodiments. Furthermore, retroreflectors can be used for device labeling, as a marker, to encode data, and the like—all of which can be interrogated/determined in accordance with the present invention.

Figure 8:
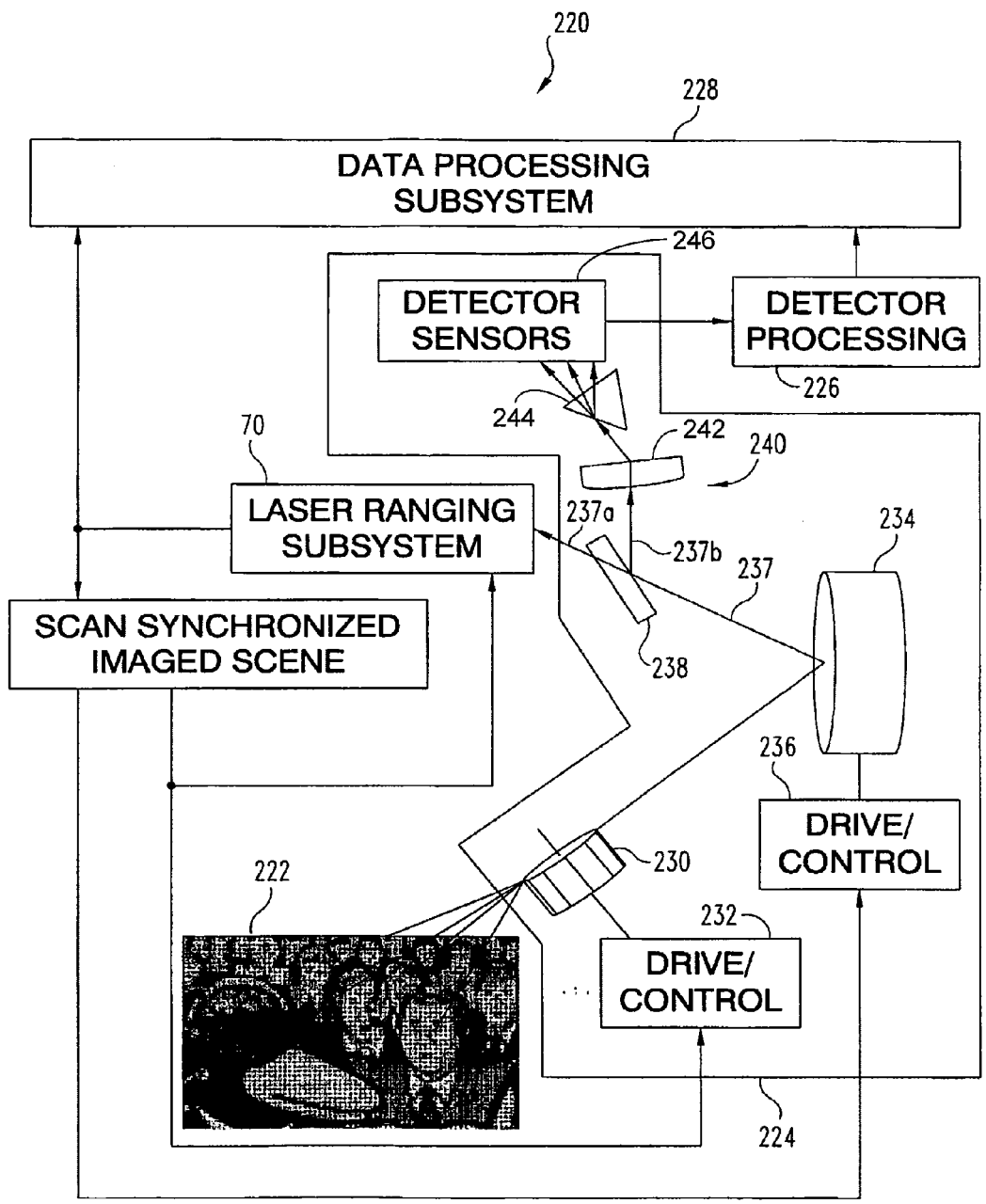
FIG. 8 is a system for evaluating an iris of the eye that includes the laser subsystem of FIGS. 2 and 3.

In one example of an alternative embodiment, FIG. 8 illustrates system 220 for evaluating an iris of the eye obtained from scanning a "sea of faces" as illustrated by the example designated by reference numeral 222. In the embodiment of FIG. 8, like reference numerals refer to like features. System 220 includes laser subsystem 70 as previously described. System 220 further includes optical scanning and detection subsystem 324, detector processing circuitry 226, and data processing subsystem 228. Also represented is a scan synchronized image scene as symbolically portrayed in FIG. 8.

Subsystem 224 includes a multifaceted scanning mirror 230 coupled to drive/control 232. Drive/control 232 controllably spins mirror 230 to provide a Field Of View (FOV) capable of scanning several faces from a desired separation distance. In one example, a 30° FOV is scanned, which has been found to allow up to 12 faces to be examined in one scan at 8 meters. The resulting scan is reflected on front surface mirror 234, which is driven by galvometer drive/control 236. The resulting beam 237 is directed to beam splitter 238 to provide a beam input 237a to subsystem 70 and beam input 237b to optics arrangement 240. Optics arrangement 240 includes cylindrical lens 242, refractive prism 244, and multispectral detectors 246. Cylindrical lens 242 compresses vertical scan pixels into a linear array that is spread with prism 244 across detectors 246. In one form, three detectors 246 are provided corresponding to three different laser wavelengths used for the scan—particularly 980 nanometers, 1200 nanometers, and 1550 nanometers. Referring to the subsystem 70 description, it should be appreciated that 980 nanometers is approximately 0.9 microns and 1550 nanometers is approximately 1.55 microns. Signals from detectors 246 are input to detector processing circuitry 226 for recovery, conditioning, and conversion to a desired digital format. These digital signals are then output by circuitry 226 to processing subsystem 228.

Processing subsystem 228 performs in accordance with operating logic as described in connection with system 20. Included in this logic, is the processing of signals from subsystem 70 to detect eye location and to perform analysis of an iris of the eye in accordance with standard iris detection algorithms. In one particular form, a 512 byte iris code using wavelet compression is derived from iris pixels, generally independent of the degree of pupil dilation.

Figure 10:
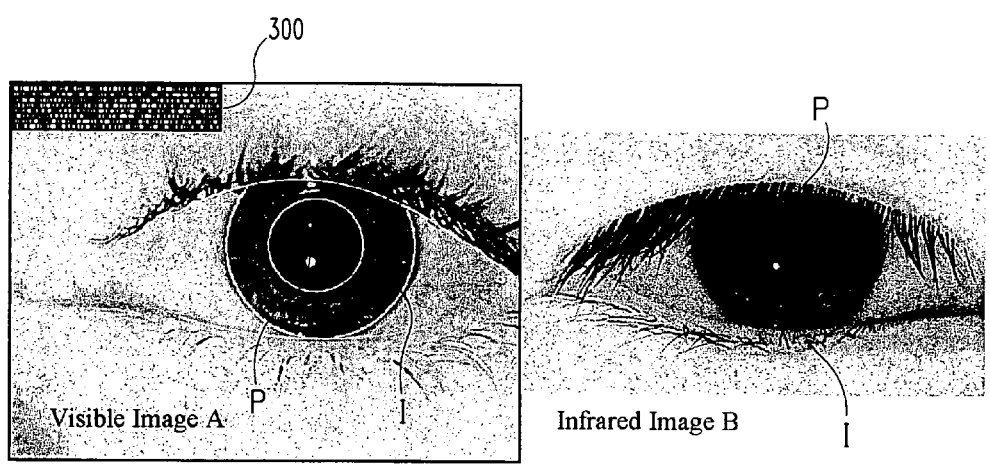
FIG. 10 provides computer-generated images of an eye to further explain selected aspects of the system of FIG. 8.

Referring to FIG. 10, a visible image A and infrared image B are presented for comparison. Further, in image A, multiscale, quadrature wavelet iris code is illustrated in the upper left hand corner as designated by reference numeral 300. In one form, subsystem 70 output is processed to determine location of pupil P to process the image of iris I. A dedicated, highly integrated digital circuit can be provided to perform on-the-fly iris imaging and processing. In one form, code processing is performed by a Field Programmable Gate Array (FPGA) arranged to perform the desired processes. Notably, this arrangement can be used to process iris images provided by one or more different wavelengths. In one particular form, multiple infrared (IR) images are processed in this manner. For further background information concerning iris processing, reference is made to J. Daugman, "How Iris Recognition Works" [www.CL.cam.ac.uk/users/jgd1000/]; J. Daugman, "Biometric Product Testing" [www.cl.cam.ac.uk/users/jgd1000/NPLsummary.gif]; J. Daugman, "The Importance of Being Random: Statistical Principles of Iris Recognition" (Elsevier Science Ltd. 2002), all of which are hereby incorporated by reference.

Figure 9:
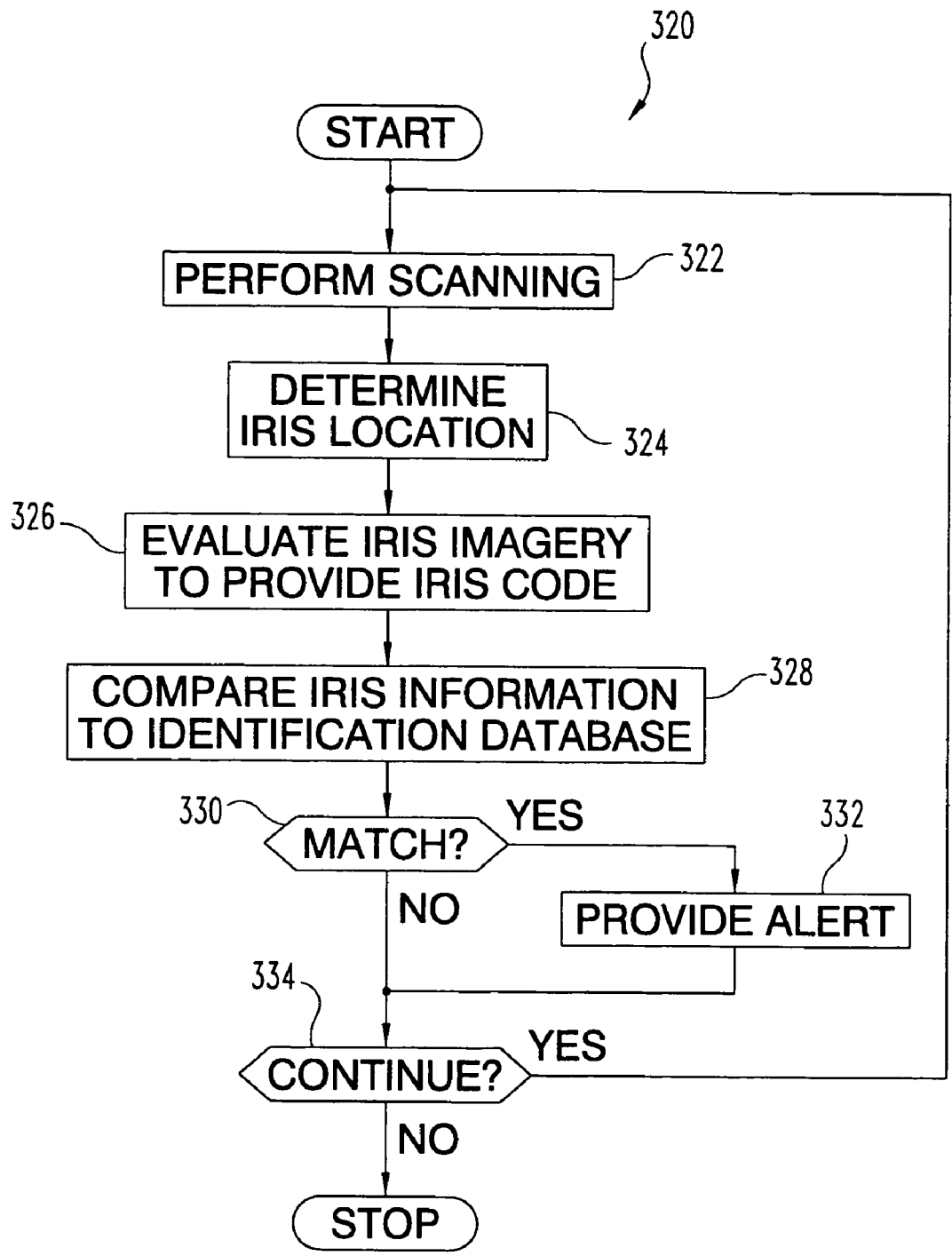
FIG. 9 is a flowchart of one mode of operating the system of FIG. 8.

Referring to FIG. 9, procedure 320 of a further embodiment of the present application is illustrated in flowchart form. Procedure 320 can be implemented with system 220, performing various operations and conditionals in accordance with operating logic of corresponding subsystems. Procedure 320 begins with operation 322 in which scanning of a scene is performed. Such a scene is illustrated in FIG. 8 as indicated by reference numeral 222. From the scanned face(s) of the scene, iris/pupil location is determined utilizing subsystem 70 in operation 324. From operation 324, procedure 320 continues with operation 326 in which iris images are evaluated to provide a corresponding iris code or other iris identification information. In one form, a quadrature wavelet form of iris code is determined in operation 326; however, in other forms different techniques can additionally or alternatively be utilized.

Procedure 320 continues with operation 328 in which the generated iris information is compared to an identification database. Such database may be local or remote relative to system 220. In one example, database information is at least partially provided through computer network 30. From operation 328, procedure 320 continues with conditional 330. Conditional 330 tests whether a match was identified in operation 328. If the test of conditional 330 is true (affirmative), the corresponding match condition is indicated by providing an alert in operation 322. If the test of conditional 330 is false (negative), then procedure 320 continues with conditional 334. From operation 332, procedure 320 proceeds to conditional 334. Conditional 334 tests whether to continue execution of procedure 320 by scanning an additional scene or rescanning as appropriate. If the test of conditional 334 is true (affirmative), procedure 320 loops back, returning to operation 332 to perform operation sequence 322-328 again. This sequence may be repeated via the loop back from conditional 334 as desired. If the test of conditional 334 is false (negative), then procedure 320 halts.

As previously indicated, numerous variations, forms, and embodiments of the present application are envisioned. In another form, the iris evaluation/comparison of procedure 320 is performed in addition to procedure 220 in which a 3-D facial feature comparison is made. In still other embodiments, other recognition/identification techniques may be combined with procedures 120 and/or 320 as desired.

Monitoring humans for biometric analysis is applicable to a wide range of technologies for purposes of identification, verification, unknown threat recognition, access control, security checkpoints, and the like. Nonetheless, in other embodiments, the transmission/reception arrangement can differ. For example, in one alternative embodiment, one or more elements 38 are used for both transmission and reception. In another alternative embodiment, a mixture of both approaches is utilized. Typically, the signals received from array 36 are downshifted in frequency and converted into a processable format through the application of standard techniques. In one form, transceiver 42 is of a bi-static heterodyne Frequency Modulated Continuous Wave (FM/CW) type like that described in U.S. Pat. No. 5,859,609 (incorporated by reference herein). Commonly owned U.S. Pat. Nos. 6,703,964 B2; 6,507,309 B2; 5,557,283; and 5,455,590, each of which are incorporated by reference herein, provide several nonlimiting examples of transceiver arrangements. In still other embodiments, a mixture of different transceiver/sensing element configurations with overlapping or nonoverlapping frequency ranges can be utilized that may include one or more of the impulse type, monostatic homodyne type, bistatic heterodyne type, and/or such other type as would occur to those skilled in the art.

Another embodiment includes: directing multiple wavelengths of electromagnetic radiation to scan a face of a person; detecting at least one of the wavelengths reflected by a first portion of an eye of the person to establish a first signal and at least one other of the wavelengths reflected by a second portion of the eye through a pupil thereof to establish a second signal; evaluating these signals to provide a value that varies with distance separating the first portion and the second portion; and determining location of the eye as a function of the value. In one form, the second portion is behind the first portion of the eye—the second portion being a retina.

Still another embodiment of the present application includes: interrogating the face of a person with coherent electromagnetic radiation including at least one wavelength reflected by a first portion of an eye and at least one other wavelength reflected by a second portion of the eye, with the second portion being behind and interior to the first portion. This embodiment further includes determining location of the eye based on the interrogation, where such location corresponds to a difference in range relative to the first and second portions and characterizing at least part of the face relative to the location of the eye for comparison to identification information. In one form, this characterization includes evaluating three-dimensional facial information corresponding to at least a portion of the face. Alternatively or additionally, this embodiment may include locating a different eye of the person based on a range difference, determining distance separating the eyes, and/or performing the characterization as a function of this distance.

Yet another embodiment includes: detecting reflection of one or more wavelengths of electromagnetic radiation by a first boundary along a face of a person; detecting reflection of one or more other wavelengths of electromagnetic radiation by a second boundary along the face; recognizing one or more portions of the face based on one of the first and second boundaries at least partially covering another of the first and second boundaries; and comparing at least part of the face to identification information in accordance with this recognition. In one form, the first boundary corresponds to makeup or a disguise placed on the face, where the second boundary might be facial skin.

A further embodiment includes a facial scanning arrangement with a first laser to provide coherent electromagnetic radiation including a first wavelength, a source to provide electromagnetic radiation including a second wavelength, and one or more detectors to sense returned electromagnetic radiation of at least each of these wavelengths. Also included is a processing subsystem coupled to the facial scanning arrangement that is responsive to signals from the one or more detectors to locate one or more portions of the face of a person scanned with the arrangement by detecting reflection of at least the first wavelength of the electromagnetic radiation by a first boundary along the face and reflection of at least the second wavelength of the electromagnetic radiation by a second boundary along the face. One of these boundaries at least partially covers another of these boundaries, and the processing subsystem is operable to compare at least part of the face to identification information in accordance with location of the one or more portions of the face. In one form, this embodiment includes the processing subsystem evaluating three-dimensional facial information relative to the identification information.

Still a further embodiment of the present invention is a system including: a facial scanning arrangement including a first laser to provide coherent electromagnetic radiation including a first wavelength, a source to provide electromagnetic radiation including a second wavelength in a range of preferably about 0.1 mm to about 100 mm and one or more detectors to sense returned electromagnetic radiation of at least the first and the second wavelengths. This system further includes a processing subsystem operatively coupled to the facial scanning arrangement that is responsive to signals from the detectors to determine a difference in range between two locations along a face of a person scanned therewith. One of these locations at least partially covers another of these locations and corresponds to reflection of the first wavelength while the other of the locations corresponds to reflection of the second wavelength as detected with the one or more detectors. The processing subsystem is further operable to recognize that the disguising material is on the face and is a function of the difference in range. The processing subsystem is further operable to identify the person based on evaluation of at least one iris of an eye, and/or determine location of one or more eyes of the person based on a laser ranging subsystem. In a more preferred embodiment, the range of electromagnetic radiation is about 1 mm to about 50 mm. In an even more preferred embodiment, this range is about 1 mm to about 10 mm.

Yet a further embodiment of the present invention includes: means for detecting reflection of one or more wavelengths of electromagnetic radiation by a first boundary along a face of a person; means for detecting reflection of one or more other wavelengths of the electromagnetic radiation by a second boundary along the face; means for recognizing one or more portions of the face based on one of the first and second boundaries at least partially covering another of the first and second boundaries; and means for comparing at least one of these portions to identification information.

Another embodiment of the present invention includes: scanning a face of a person with laser equipment; determining eye location from this scan based on range information from the equipment that is indicative of a first eye portion being separated from and in front of a second eye portion; generating identification information for an iris of the eye located relative to the eye location; and comparing this identification information to data from an identification database.

For yet another embodiment, a system includes: a facial scanning arrangement with laser equipment to interrogate a person with electromagnetic radiation, which is operable to provide range information and image data. This system also includes a processing subsystem responsive to the facial scanning arrangement to generate a number of signals. These signals are representative of eye location determined from the range information, identification information determined from the image data for an iris of the eye located with the eye location, and a comparison of the identification information to data from an identification database. An output device may also be included that is responsive to one or more of the signals if the comparison indicates a match of the person to an individual characterized in the database.

Still another embodiment of the present invention includes: scanning a face of a person with laser equipment; determining eye location from the scan based on range information; generating three-dimensional facial feature information relative to the eye location; and comparing the three-dimensional facial feature information to data from an identification database.

Still another embodiment includes: a facial scanning arrangement with laser equipment and a processing subsystem responsive to such arrangement. The processing subsystem generates a number of signals that are representative of eye location determined from range information provided by the laser equipment, three-dimensional facial feature information determined relative to the eye location, and at least one comparison of the three-dimensional facial feature information to data from an identification database.

A further embodiment includes: means for scanning a face of a person with laser ranging equipment; means for determining an eye of the person based on range information from the scanning means; at least one of means for generating identification information from image data for an iris of the eye and means for generating three-dimensional facial feature information relative to the eye location; and means for comparing the identification information to data from an identification database.

Still a further embodiment is directed to a method that includes: directing multiple wavelengths of electromagnetic radiation to scan an object including a retro-reflector, detecting at least one of the wavelengths reflected by a first portion of the object to establish a first signal, detecting at least one other of the wavelengths reflected by a second portion of the object to establish a second signal, and determining a relative location or distance as a function of the first signal and the second signal. In other embodiments of the present application, apparatus, systems, devices, and the like can be provided that implement this method.

As used herein, "millimeter wave" or "millimeter wavelength" refers to any electromagnetic radiation that has a wavelength in the range from about 0.1 millimeter to about 100 millimeters when propagating through free space. Also, as used herein, it should be appreciated that: variable, criterion, characteristic, comparison, quantity, amount, information, value, level, term, constant, flag, data, record, threshold, limit, input, output, pixel, image, matrix, command, look-up table, profile, schedule, or memory location each generally correspond to one or more signals within processing equipment of the present invention. It is contemplated that various operations, stages, conditionals, procedures, thresholds, routines, and processes described in connection with the present invention could be altered, rearranged, substituted, deleted, duplicated, combined, or added as would occur to those skilled in the art without departing from the spirit thereof. It should be noted that implementation of the disclosed embodiments of the present invention is not limited to those depicted in the figures.

All publications and patent applications cited in this specification are herein incorporated by reference as if each individual publication or patent application were specifically and individually indicated to be incorporated by reference. Further, any theory, mechanism of operation, proof, or finding stated herein is meant to further enhance understanding of the present invention, and is not intended to limit the present invention in any way to such theory, mechanism of operation, proof, or finding. While the invention has been illustrated and described in detail in the drawings and foregoing description, the same is to be considered as illustrative and not restrictive in character, it being understood that only selected embodiments have been shown and described and that all equivalents, changes, and modifications that come within the spirit of the inventions as defined herein or by the following claims are desired to be protected.

What is claimed is:

1. A method, comprising:
   providing an electromagnetic radiation emitting device;
   providing at least one electromagnetic radiation receiving device;
   directing multiple wavelengths of electromagnetic radiation from the electromagnetic emitting device to scan a face of a person;
   detecting at least one of the wavelengths reflected by a first portion of an eye of the person with the at least one electromagnetic radiation receiving device to establish a first signal;
   detecting at least one other of the wavelengths reflected by a second portion of the eye through a pupil thereof with the at least one electromagnetic radiation receiving device to establish a second signal, the second portion being behind and interior to the first portion; and
   determining a location of the eye relative to one or more facial features as a function of the first signal and the second signal, the first signal and the second signal being indicative of a distance separating the first portion and the second portion,
   wherein the first signal is determined as a function of a first phase shift representative of a range to the first portion, the second signal is determined as a function of a second phase shift representative of range to the second portion, and
   wherein the act of determining the location of the eye includes finding a difference between the first range and the second range to provide a value, and comparing the value to a threshold amount indicative of eye location.

2. The method of claim 1, wherein the second portion includes a retina of the eye.

3. The method of claim 1, wherein the first signal and second signal indicate a difference in range between the first portion and the second portion that correspond to the location of the eye, and which includes locating another eye of the person based on a second range difference.

4. The method of claim 1, wherein the one of the wavelengths is greater than 1.00 micrometer and the one other of the wavelengths includes a wavelength less than 1.00 micrometer.

5. The method of claim 4, wherein the wavelength greater than 1.00 micrometer is at least 1.40 micrometers and the wavelength less than 1.00 micrometer is no more than 0.95 micrometer.

6. The method of claim 1, wherein the first signal is determined as a function of a first amplitude of reflection of the one of the wavelengths from the first portion, the second signal is determined as a function of a second amplitude of reflection of the one other of the wavelengths from the second portion, and the act of determining the location of the eye includes determining a ratio between the first amplitude and the second amplitude.

7. The method of claim 1, wherein the electromagnetic radiation includes one or more wavelengths between about 0.1 millimeter and 100 millimeters to determine if a disguising material at least partially covers the face.

8. A method, comprising:
   providing a scanning apparatus comprising an electromagnetic radiation emitting device and at least one electromagnetic radiation receiving device;
   interrogating a face of a person with coherent electromagnetic radiation from the electromagnetic radiation emitting device, the coherent electromagnetic radiation including at least one wavelength emitted by the electromagnetic radiation emitting device and reflected by a first portion of an eye of the face and at least one other wavelength emitted by the electromagnetic radiation emitting device and reflected by a second portion of the eye, the second portion being behind and interior to the first portion;

measuring a phase change of the radiation reflected by the first portion and a phase change of the radiation reflected by the second portion;

determining a location of the eye based on a phase difference between the radiation reflected by the first and second portions; and characterizing at least part of the face relative to the location of the eye for comparison to identification information.

9. The method of claim 8, wherein the part of the face includes an iris of the eye and further comprising evaluating an image of the iris for the comparison to the identification information.

10. The method of claim 8, wherein the electromagnetic radiation includes one or more wavelengths between about 0.1 millimeter and 100 millimeters to determine if a disguising material at least partially covers the face.

11. The method of claim 8, wherein the second portion includes a retina of the eye.

12. The method of claim 11, which includes locating a different eye of the person based on a second range difference, determining distance separating the eye and the different eye, and performing the characterizing as a function of the distance.

13. The method of claim 8, wherein the at least one wavelength is greater than or equal to 1.40 micrometers and the at least one other wavelength includes a wavelength less than or equal to 0.95 micrometer.

14. The method of claim 8, wherein the characterizing includes evaluating three-dimensional facial information.

15. A method, comprising:

providing at least one electromagnetic radiation emitting device and at least one electromagnetic radiation receiving device;

scanning a face of a person to detect reflection of one or more wavelengths of electromagnetic radiation by a first boundary along a face of a person with the at least one electromagnetic radiation receiving device;

detecting reflection of one or more other wavelengths of electromagnetic radiation by a second boundary along the face with the at least one electromagnetic radiation receiving device, the detected reflection from the second boundary passing through at least a portion of the first boundary that overlaps the second boundary;

measuring a phase change of the radiation reflected by the first portion and a phase change of the radiation reflected by the second portion;

determining spatial coordinates of the face by determining a phase difference between the radiation reflected by the first and second portions;

recognizing one or more portions of the face based on the determination of the spatial coordinates of the face; and comparing at least part of the face to identification information in accordance with the recognizing.

16. The method of claim 15, wherein the first boundary corresponds to an outer surface of an eye of the face, and the one or more portions of the face include the eye.

17. The method of claim 15, wherein the first boundary corresponds to make-up or a disguise on the face.

18. The method of claim 15, wherein the one or more portions of the face include an eye of the face and further comprising imaging an iris of the eye to compare to the identification information.

19. The method of claim 15, which includes interrogating the face with electromagnetic radiation including one or more wavelengths between about 0.1 millimeter and 100 millimeters to determine if a material at least partially covers the face.

20. The method of claim 15, wherein the one or more wavelengths include a wavelength greater than or equal to 1.40 micrometers and the one or more other wavelengths include a wavelength less than or equal to 0.95 micrometer.

21. The method of claim 15, which includes locating each of two eyes of the face as function of at least one of an amplitude difference and a phase difference.

22. The method of claim 1, further comprising:

performing an analysis of an iris of the eye located by the act of determining the location of the eye;

wherein the performing of the analysis of the iris comprises detecting at least one of the wavelengths reflected by the iris.

23. The method of claim 1, wherein one or more of the multiple wavelengths of electromagnetic radiation are amplitude modulated.

24. The method of claim 1, wherein the first phase shift is determined simultaneously with a determination of a first amplitude of the wavelength reflected by the first portion of the eye, and the second phase shift is determined simultaneously with a determination of a second amplitude of the wavelength reflected by the second portion of the eye.

25. The method of claim 8, wherein the electromagnetic radiation emitting device comprises a multispectral source having at least two lasers, the at least two lasers including a first laser and a second laser that are substantially optically aligned and emit radiation that is synchronously amplitude modulated, wherein the first laser emits radiation with the at least one wavelength and the second laser emits radiation with the at least one other wavelength.

26. The method of claim 8, further comprising:

measuring an intensity of the radiation reflected by the first portion and an intensity of the radiation reflected by the second portion, wherein the determining of the location of the eye is also based on determining a change in the relative intensities of the radiation reflected by the first and second portions.

27. The method of claim 15, wherein the electromagnetic radiation emitting device comprises a multispectral source having at least two lasers, the at least two lasers including a first laser that emits a radiation of a first wavelength and a second laser that emits radiation of a second wavelength, the first and second lasers being substantially optically aligned and emitting radiation that is synchronously amplitude modulated.

28. The method of claim 15, further comprising:

measuring an intensity of the radiation reflected by the first portion and an intensity of the radiation reflected by the second portion, wherein the determining of the spatial coordinates of the face is also based on determining a change in the relative intensities of the radiation reflected by the first and second portions.

* * * * *